UNITED STATES PATENT OFFICE.

JNO. D. GREENWOOD AND RICHD. W. KEENE, OF BELVIDERE ROAD, LAMBETH, COUNTY OF SURREY, ENGLAND.

IMPROVEMENT IN CEMENTS FOR FORMING ARTIFICIAL STONE, &c.

Specification forming part of Letters Patent No. 1,361, dated October 9, 1839.

*To all whom it may concern:*

Be it known that we, JOHN DANFORTH GREENWOOD and RICHARD WYNN KEENE, subjects of the Queen of Great Britain, and now residing in the Belvidere Road, Lambeth, in the county of Surrey, cement-manufacturers, have invented an improvement in the manufacture of cement and in the application of cements and other earthy substances to the purpose of producing ornamental surfaces; and we, the said JOHN DANFORTH GREENWOOD and RICHARD WYNN KEENE, do hereby declare that the nature of our said invention and the manner in which the same is to be performed are fully described and ascertained in and by the following statement thereof—that is to say:

Our invention relates to a mode of producing cements from gypsum or sulphate of lime and alum.

To make a white cement, we take any quantity of gypsum or sulphate of lime as quarried, which is to be deprived of its waters of crystallization by heat in a similar manner to that employed in the manufacture of plaster-of-paris of commerce, as is well understood. Into a large tank, according to the quantity of gypsum, place a number of gallons of water, having dissolved therein one pound of alum of commerce for each gallon of water, into which the gypsum above mentioned is placed and allowed to remain until it has taken up as much as possible of the liquid. The stone thus saturated is then to be removed from the said liquid and suffered to dry in the air, and is afterward calcined in an oven-furnace or kiln at a low red heat, visible by daylight, in order to permanently fix the alum. The product is next to be ground to a powder, and, if necessary, sifted for use.

When a white cement of greater purity is required for particular purposes, we select the cleanest and best quality of gypsum or sulphate of lime, either before or after it is first subjected to heat, but previously to the process of saturation.

For a colored cement we dissolve half a pound of alum of commerce with one-quarter of a pound of copperas or sulphate of iron in each gallon of water, and at this rate for any number of gallons of liquid that may be required, and, excepting the components of this liquid mixture, the process of manufacturing the colored cement is to be the same as previously described for the white cement, and the result will be a pale-red cement.

It should be observed that in the calcining of the mixtures heat is not to be continued so as to produce a smell of sulphur; but a workman after a little practice will soon become fully acquainted with the process.

In using cements of the above description first as a stucco for buildings generally, either internally or externally, it is used in the same manner as any other cement or plaster now in use. Should a grit be required, we prefer the scoria, or slag of iron, or other vitrified mass, reduced by pounding or other means to a sharp grit, and use it merely in sufficient quantity to cause the cement to work freely. Where the surface be required to be polished the last coat is to be of the cement alone, and in most instances the polish given by troweling is sufficient; but a superior surface is obtained by pursuing the methods used in polishing scagliona.

Having thus described the nature of our invention, we would remark that although we have described the best means of carrying out the same, we do not confine ourselves to the precise methods or quantities explained, provided the principle of our invention be retained, and the cement may be mixed with other materials than those above named, our invention not relating to the mode of mixing and using the cement when made, but consists in the mode of making the cement itself; but we would have it understood that—

What we claim as our invention is—

The mode of making cement from gypsum or sulphate of lime by calcining in combination with alum, as above explained.

J. D. GREENWOOD.
R. W. KEENE.

Witnesses:
JOHN TINDALE,
JAMES PAGE.